United States Patent
Hori et al.

(10) Patent No.: US 8,294,820 B2
(45) Date of Patent: Oct. 23, 2012

(54) VIDEO SIGNAL SYNCHRONIZATION SIGNAL GENERATING APPARATUS AND VIDEO SIGNAL SYNCHRONIZATION SIGNAL GENERATION METHOD

(75) Inventors: Yasuhiro Hori, Tokyo (JP); Koichi Sato, Kanagawa (JP); Takeshi Inagaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 706 days.

(21) Appl. No.: 12/541,348

(22) Filed: Aug. 14, 2009

(65) Prior Publication Data

US 2010/0045865 A1 Feb. 25, 2010

(30) Foreign Application Priority Data

Aug. 20, 2008 (JP) ................................. 2008-212020

(51) Int. Cl.
  *H04N 5/06* (2006.01)
  *H04N 9/45* (2006.01)
  *H04N 9/455* (2006.01)
(52) U.S. Cl. ........ 348/521; 348/524; 348/547; 348/500; 348/512; 348/525; 348/441; 348/443; 348/513; 348/516; 348/518; 348/E5.011; 348/536
(58) Field of Classification Search .................. None
  See application file for complete search history.

(56) References Cited

U.S. PATENT DOCUMENTS

| | | | |
|---|---|---|---|
| 5,294,983 A * | 3/1994 | Ersoz et al. | 348/521 |
| 5,299,007 A | 3/1994 | Saeger et al. | |
| 6,229,573 B1 * | 5/2001 | Sato et al. | 348/516 |

FOREIGN PATENT DOCUMENTS

JP 2004-274576 9/2004

* cited by examiner

*Primary Examiner* — Jefferey Harold
*Assistant Examiner* — Omer Khalid
(74) *Attorney, Agent, or Firm* — Turocy & Watson, LLP

(57) ABSTRACT

A video signal synchronization signal generating apparatus for making a display reference synchronization signal Vb that serves as a reference of video display and has a first frequency and an input synchronization signal Vi that constitutes images and has a second frequency synchronized with each other, the apparatus including: a frequency ratio generating section configured to divide a frequency that is double the first frequency by the second frequency to calculate a frequency ratio n; a Vx generation comparator circuit section configured to generate coincidence signal Vx' having pulses that are inserted by equally dividing one period of the input synchronization signal Vi by the frequency ratio n; and a Vx generation circuit section configured to remove the alternate pulses of the coincidence signal Vx' to generate synchronization signal Vx of a same phase as the phase of the input synchronization signal Vi.

14 Claims, 3 Drawing Sheets

VIDEO SIGNAL SYNCHRONIZATION SIGNAL GENERATING APPARATUS AND VIDEO SIGNAL SYNCHRONIZATION SIGNAL GENERATION METHOD

CROSS-REFERENCE TO RELATED APPLICATION

This application is based upon and claims the benefit of priority from the prior Japanese Patent Application 2008-212020 filed in Japan on Aug. 20, 2008, the entire contents of which are incorporated herein by reference.

BACKGROUND OF THE INVENTION

1. Field of the Invention

The present invention relates to a video signal synchronization signal generating apparatus, and more particularly, to a video signal synchronization signal generating apparatus as a control apparatus for a synchronization signal which serves as a display output control signal, to be used with a video reproducing device which displays a video signal of an input vertical synchronization signal having a frequency different from the frequency of a display vertical synchronization signal, and to a video signal synchronization signal generation method.

2. Description of Related Art

In general, for video reproducing devices such as flat panel displays (hereinafter abbreviated as "FPDs"), standards for period range of frequency of a vertical synchronization signal for video output (hereinafter referred to as "display vertical synchronization frequency") are defined according to device size and/or model. And most of such standards set an extremely narrow acceptable range for the period of the vertical synchronization signal.

Meanwhile, types of video signal for reproduction on video reproducing devices such as FPDs are becoming more and more diverse, and the input vertical synchronization frequency of such a video signal is often different from display vertical synchronization frequency. For example, this is a case when video reproduction output having an input vertical synchronization frequency of 24 Hz is displayed on a FPD having a display vertical synchronization frequency of 60 Hz.

One conventionally known method for displaying such video reproduction output having an input vertical synchronization frequency of 24 Hz on a video device having a display vertical synchronization frequency of 60 Hz is to generate an input signal with 60 frames/second from a video signal made up of 24 frames/second through telecine conversion of individual frames of the video reproduction output by using 2-3 pull-down method (see Japanese Patent Application Laid-Open Publication No. 2004-1274576, for instance).

However, even when a frequency difference between the input vertical synchronization frequency and the display vertical synchronization frequency is made apparently equal by adding frames as shown in Japanese Patent Application Laid-Open Publication No. 2004-1274576, the input vertical synchronization frequency and the display vertical synchronization frequency become slightly misaligned in practice due to clock synchronization error or the like to cause an asynchronous condition. An asynchronous condition leads to a problem of significant degradation of video quality due to skipping and/or repeating of images.

BRIEF SUMMARY OF THE INVENTION

A video signal synchronization signal generating apparatus according to an embodiment of the present invention is a video signal synchronization signal generating apparatus for making a display reference synchronization signal that serves as a reference of video display and has a first frequency and an input synchronization signal that constitutes images and has a second frequency synchronized with each other and outputting a resulting signal as a display synchronization signal, the apparatus includes: a frequency ratio generating section configured to divide a frequency that is double the first frequency by the second frequency to calculate a frequency ratio; and a synchronization signal generating section configured to generate a signal having pulses that are inserted by equally dividing one period of the input synchronization signal by the frequency ratio and remove the alternate pulses of the signal to generate a synchronization signal of a same phase as the phase of the input synchronization signal.

BRIEF DESCRIPTION OF THE DRAWINGS

FIG. 3A shows a timing chart of when input synchronization signal Vi having a frequency of 24 Hz is synchronized to display reference synchronization signal Vb of 60 Hz, and FIG. 3B shows a timing chart of when input synchronization signal Vi having a frequency of 25 Hz is synchronized to display reference synchronization signal Vb.

DETAILED DESCRIPTION OF THE INVENTION

Hereinafter, an embodiment of the present invention will be described with reference to drawings.

Figure 1:
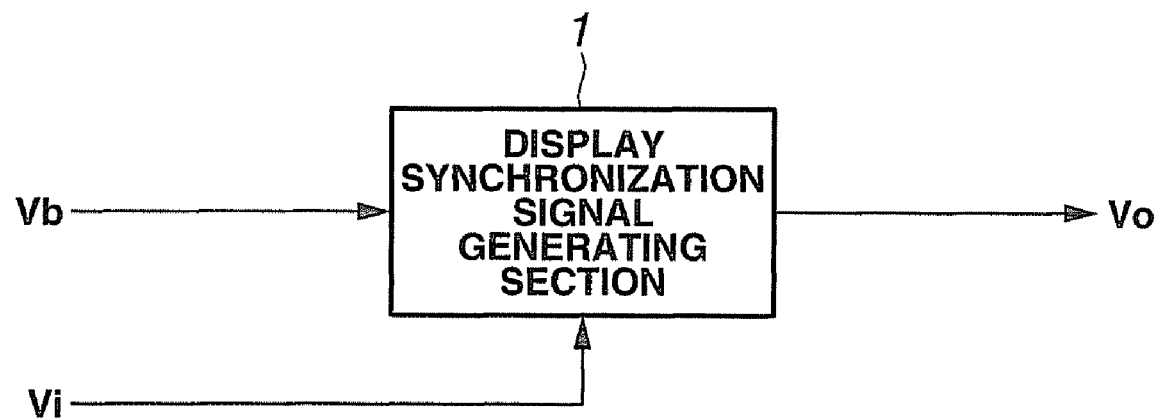
FIG. 1 is a schematic block diagram illustrating a configuration of a video signal synchronization signal generating apparatus according to an embodiment of the present invention.

First, with reference to FIG. 1, the configuration of a video signal synchronization signal generating apparatus according to an embodiment of the present invention is described. FIG. 1 is a schematic block diagram illustrating a configuration of the video signal synchronization signal generating apparatus according to an embodiment of the present invention.

As shown in FIG. 1, the video signal synchronization signal generating apparatus according to the present invention has a display synchronization signal generating section 1 to which a display reference synchronization signal Vb having a display vertical synchronization frequency (e.g., 60 Hz) and an input synchronization signal Vi having an input vertical synchronization frequency (e.g., 24 Hz) are input and which outputs a display synchronization signal Vo having a frequency that can be synchronized to the display reference synchronization signal Vb.

Figure 2:
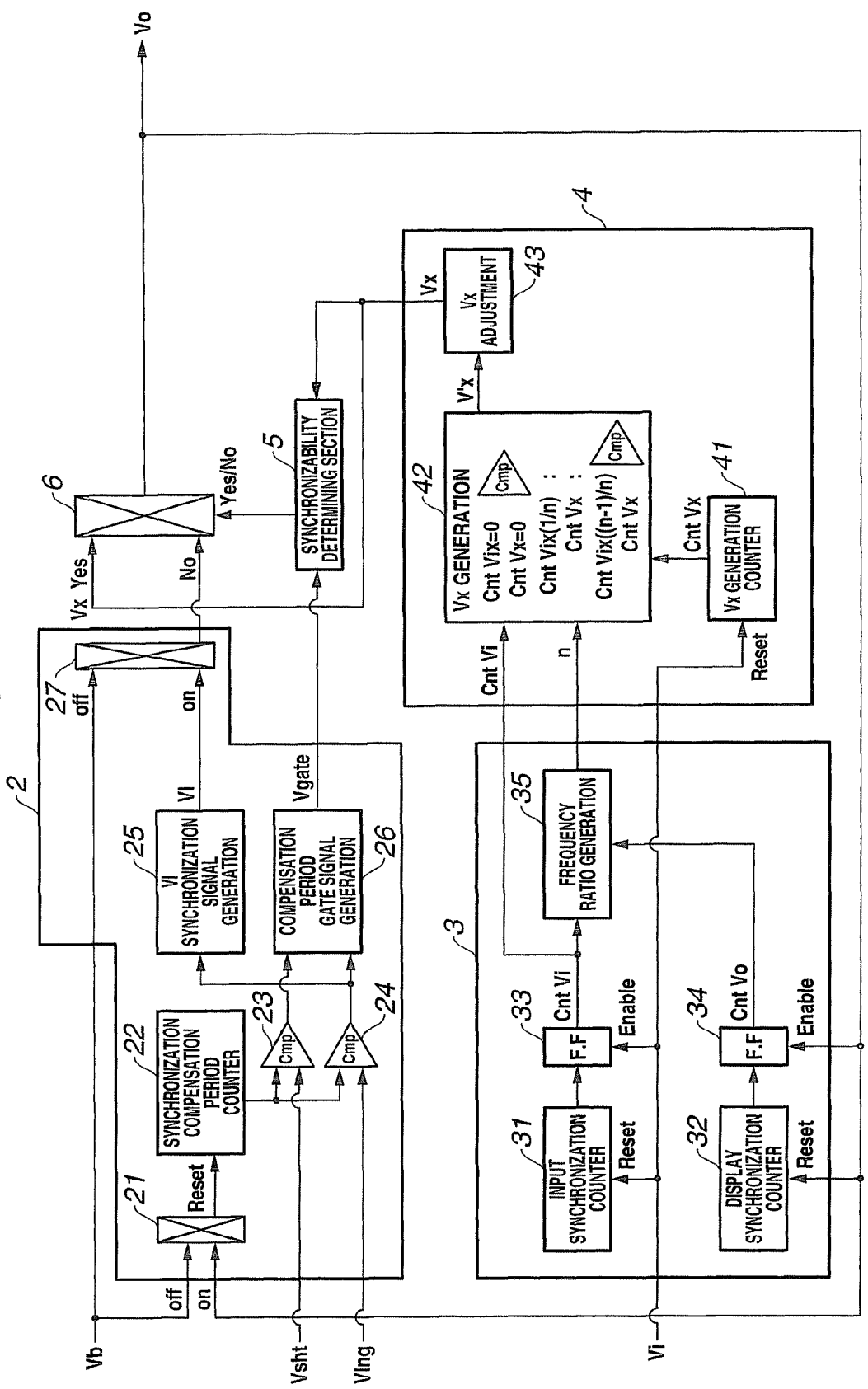
FIG. 2 is a schematic block diagram illustrating the configuration of a display synchronization signal generating section 1.

A detailed configuration of the display synchronization signal generating section 1 is described using FIG. 2. FIG. 2 is a schematic block diagram illustrating the configuration of the display synchronization signal generating section 1.

As shown in FIG. 2, the display synchronization signal generating section 1 includes a display compensation section 2 configured to compensate for the display reference synchronization signal Vb so that the signal Vb comes within an acceptable period range that is displayable, a frequency ratio detecting section 3 configured to detect a frequency ratio between the display synchronization signal Vo and the input synchronization signal Vi, a synchronization frequency generating section 4 configured to generate a synchronization signal Vx having a synchronization frequency to which the display reference synchronization signal Vb and the input synchronization signal Vi can be synchronized based on the input synchronization signal Vi and output from the frequency ratio detecting section 3, a synchronizability determining section 5 configured to determine whether the synchronization signal Vx is within an acceptable displayable period range, and a display synchronization selecting section 6 configured to select a synchronization signal to be output as display synchronization signal Vo.

The display compensation section 2 includes compensation mode selecting sections 21 and 27 configured to select and switch between enabling and disabling of display compensation, a synchronization compensation period line counter 22, a comparator 23 configured to compare a counter value of the synchronization compensation period line counter 22 with a minimum set value Vsht of display compensation range, a comparator 24 configured to compare a counter value of the synchronization compensation period line counter 22 with a maximum set value Vlng of display compensation range, a Vl synchronization signal generating section 25 configured to generate a synchronization signal Vl based on an output result from the comparator 24, and a compensation period gate signal generating section 26 configured to generate a gate signal Vgate used for determining whether a time of a leading edge of an arbitrary synchronization signal V is greater than or equal to Vsht and smaller than Vlng or not.

The display reference synchronization signal Vb input to the display synchronization signal generating section 1 is input to the compensation mode selecting sections 21 and 27. In the compensation mode selecting sections 21 and 27, enabling/disabling of display compensation is selected on a software basis. When display compensation is disabled, the display reference synchronization signal Vb is output from the compensation mode selecting section 27. The compensation mode selecting sections 21 and 27 have their modes (i.e., enabling/disabling of display compensation) coordinated with each other so that a same mode is always selected.

When display compensation is enabled, the synchronization compensation period line counter 22 starts counting of a number of lines of the display reference synchronization signal Vb. The counter value of the synchronization compensation period line counter 22 is incremented by one starting at zero and is reset to zero in synchronization with the period of the display reference synchronization signal Vb or display synchronization signal Vo. The counter value is output to the comparators 23 and 24.

The comparator 23 compares the line counter value input from the synchronization compensation period line counter 22 with the minimum set value Vsht of display compensation range. The result of comparison is output to the compensation period gate signal generating section 26. The comparator 24 compares the line counter value input from the synchronization compensation period line counter 22 with the maximum set value Vlng of display compensation range. The result of comparison is output to the Vl synchronization signal generating section 25 and compensation period gate signal generating section 26.

The Vl synchronization signal generating section 25 uses output from the comparator 24 to generate a synchronization signal Vl which synchronizes to a time at which the line counter value of display reference synchronization signal Vb agrees with the maximum set value Vlng of display compensation range. The generated synchronization signal Vl is a synchronization signal having a displayable lowest frequency and is output to the compensation mode selecting section 27.

The compensation period gate signal generating section 26 uses inputs from the comparators 23 and 24 to generate a rectangular wave that rises at a time when the line counter value of display reference synchronization signal Vb agrees with the minimum set value Vsht of display compensation range and falls at a time when the line counter value of display reference synchronization signal Vb agrees with the maximum set value Vlng of display compensation range. The generated rectangular wave is output to the synchronizability determining section 5 as a gate signal Vgate used for determining whether the leading edge of synchronization signal Vx output from a generation circuit 43, which is discussed below, is present within a range from Vsht to Vlng or not. That is to say, display compensation is effected such that the frequency of a display synchronization signal comes within a frequency limit range from a preset displayable lowest frequency to a preset displayable highest frequency.

A signal output from the compensation mode selecting section 27 to the display synchronization selecting section 6 is different between when display compensation is enabled and when it is disabled. When display compensation is enabled, synchronization signal Vl input from the Vl synchronization signal generating section 25 is output. On the other hand, when display compensation is disabled, display reference synchronization signal Vb input from the compensation mode selecting section 21 is output.

The frequency ratio detecting section 3 includes an input synchronization counter 31 for detecting the period of input synchronization signal Vi, a display synchronization counter 32 for detecting the period of display synchronization signal Vo, an input synchronization counter value maintaining section 33 configured to maintain the counter value of the input synchronization counter 31, a display synchronization counter value maintaining section 34 configured to maintain the counter value of the display synchronization counter 32, and a frequency ratio generating section 35 configured to calculate the ratio between the frequency of input synchronization signal Vi and the frequency of display synchronization signal Vo.

The input synchronization counter 31 is a counter for counting values at a certain rate starting at zero and resetting its counter value in synchronization with input synchronization signal Vi. The counter value is output to the input synchronization counter value maintaining section 33. The input synchronization counter value maintaining section 33 maintains a counter value CntVi immediately before being reset until a next reset. In other words, the input synchronization counter value maintaining section 33 maintains for one certain period of input synchronization signal Vi a counter value that has been counted by the input synchronization counter 31 in an immediately preceding period and is immediately before being reset upon termination of the period.

The counter value CntVi maintained in the input synchronization counter value maintaining section 33 is output to the frequency ratio generating section 35 and the synchronization frequency generating section 4.

Meanwhile, the display synchronization counter 32 is a counter which counts values at a certain rate starting at zero and resets its counter value in synchronization with display synchronization signal Vo. The counter value is output to the display synchronization counter value maintaining section 34. The display synchronization counter value maintaining section 34 maintains a counter value CntVo immediately before being reset until the next reset. In other words, the display synchronization counter value maintaining section 34 maintains for one certain period of input synchronization signal Vo a counter value that has been counted by the display synchronization counter 32 in the immediately preceding period and is immediately before being reset upon termination of the period.

The counter value CntVo maintained in the display synchronization counter value maintaining section 34 is output to the frequency ratio generating section 35.

The frequency ratio generating section 35 compares the counter value CntVi input from the input synchronization counter value maintaining section 33 with a value which is a double of the counter value CntVo input from the display synchronization counter value maintaining section 34, and calculates the frequency ratio n between (a double-speed signal of) display synchronization signal Vo and input synchronization signal Vi. By way of example, when the frequency of input synchronization signal Vi is 24 Hz and the frequency of display synchronization signal Vo is 60 Hz, $24/(60*2)=\frac{1}{5}$ and hence n is calculated as n=5.

An intention of calculating the frequency ratio with the frequency of display synchronization signal Vo doubled is to accommodate a case where input synchronization signal Vi is displayed on a video reproducing device in an interlaced format. The frequency ratio (n) calculated is output to the synchronization frequency generating section 4.

The synchronization frequency generating section 4 is composed of a Vx generation counter 41 for generating synchronization signal Vx, a Vx generation comparator circuit section 42 configured to generate coincidence signal Vx' that rises at times that are points of equal division of CntVi by the frequency ratio n, and a Vx generation circuit section 43 as a synchronization signal generating section configured to generate synchronization signal Vx by removing the alternate leading edges of coincidence signal Vx'.

The Vx generation counter 41 is a counter that counts values at a certain rate starting at zero and resets its counter value in synchronization with input synchronization signal Vi just as the input synchronization counter 31. The counter value CntVx is output to the Vx generation comparator circuit section 42.

The Vx generation comparator circuit section 42 compares a value obtained by equally dividing the counter value CntVi input from the input synchronization counter value maintaining section 33 by the frequency ratio n input from the frequency ratio generating section 35 with the counter value CntVx input from the Vx generation counter 41, and generates a signal that rises at times when the two values agree with each other (a coincidence signal Vx).

For example, when counter value CntVi=3093750 and n=5, a signal that rises at times when CntVx agrees with 3093750*0, 3093750*($\frac{1}{5}$), 3093750*($\frac{2}{5}$), 3093750*($\frac{3}{5}$), and 3093750*($\frac{4}{5}$) is output as the coincidence signal Vx'.

The Vx generation circuit section 43 generates the synchronization signal Vx by removing the alternate leading edges of coincidence signal Vx' which has been input, and outputs the synchronization signal Vx to the synchronizability determining section 5 and the display synchronization selecting section 6.

Figure 3A:
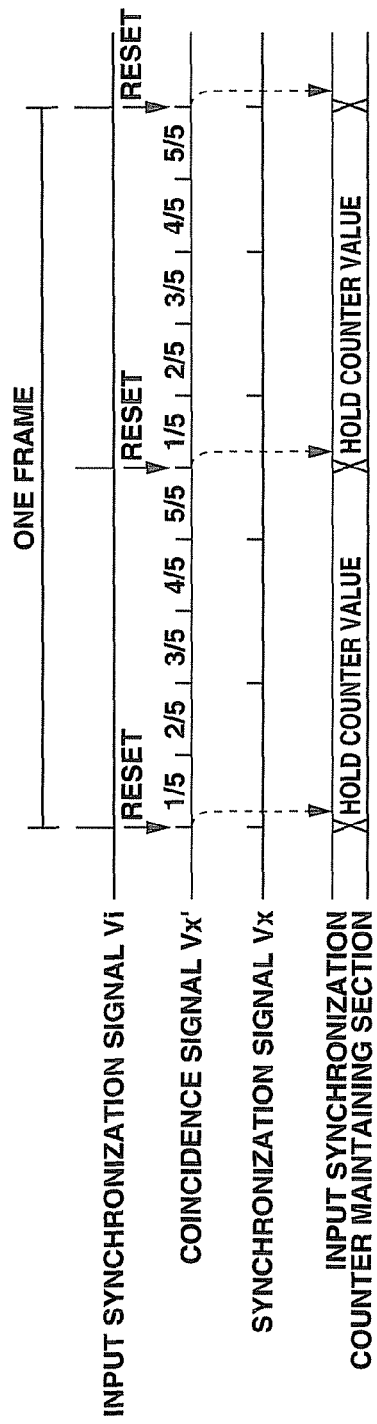
FIGS. 3A and 3B are timing charts illustrating relation among input synchronization signal Vi, coincidence signal Vx', and synchronization signal Vx, where
Figure 3B:
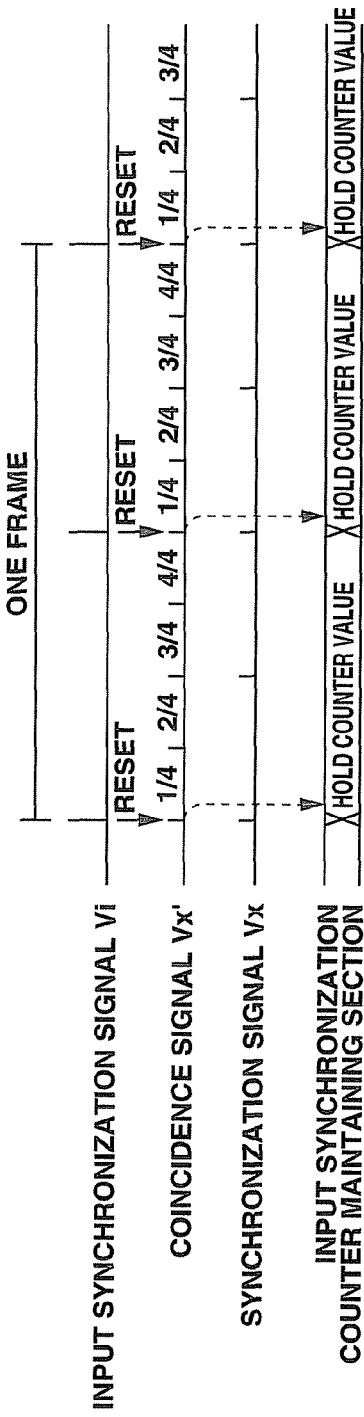

Relation among input synchronization signal Vi, coincidence signal Vx', and synchronization signal Vx is described using the timing charts shown in FIGS. 3A and 3B. FIGS. 3A and 3B are timing charts illustrating the relation among input synchronization signal Vi, coincidence signal Vx', and synchronization signal Vx. FIG. 3A shows a timing chart of when input synchronization signal Vi having a frequency of 24 Hz is synchronized to display reference synchronization signal Vb of 60 Hz, and FIG. 3B shows a timing chart of when input synchronization signal Vi having a frequency of 25 Hz is synchronized to display reference synchronization signal Vb of 50 Hz.

As shown in FIG. 3A, two periods of input synchronization signal Vi having a frequency of 24 Hz constitute one frame. The input synchronization counter value maintaining section 33 is reset in synchronization with input synchronization signal Vi and maintains the counter value CntVi of the input synchronization counter 31 just before a reset until the next reset.

The frequency ratio between the frequency of input synchronization signal Vi and a frequency that is double the frequency of display synchronization signal Vo (=display reference synchronization signal Vb) is n=60*2/24=5. Therefore, coincidence signal Vx' is a signal (or pulses) that has leading edges at times when points of equal division of the counter value CntVi into five parts agree with counter value CntVx. Accordingly, the coincidence signal Vx' is reset at times at which input synchronization signal Vi rises, and has leading edges at points of division of one period of input synchronization signal Vi into five equal parts as shown in FIG. 3A.

The synchronization signal Vx is generated by removing the alternate leading edges (or pulses) of coincidence signal Vx'. More specifically, a signal (or pulses) formed by removing the second, fourth, sixth, . . . , 2mth (m being a natural number), namely leading edges (or pulses) of even numbers, from coincidence signal Vx' to leave only leading edges of odd numbers represents the synchronization signal Vx.

By thus generating the synchronization signal Vx, it is possible to set the frequency of synchronization signal Vx to a frequency in proximity to the display reference synchronization signal Vb and have the points of start of individual frames of input synchronization signal Vi always coincide with leading edges of the synchronization signal Vx. Synchronization of input synchronization signal Vi having a frequency of 25 Hz with display reference synchronization signal Vb of 50 Hz, shown in FIG. 3B, is similar to the case of FIG. 3A described above except that the frequency ratio is 4 instead of 5.

The synchronizability determining section 5 determines whether the leading edge of synchronization signal Vx is present within a compensation period using gate signal Vgate input from the compensation period gate signal generating section 26. If the leading edge of synchronization signal Vx is present within a range from Vsht to Vlng, it is determined that the leading edge is within the compensation period. On the other hand, if the leading edge of the synchronization signal Vx is not present within the range from Vsht to Vlng, it is determined that the leading edge is outside the compensation period. The result of determination is output to the display synchronization selecting section 6.

The display synchronization selecting section 6 selects an appropriate signal from various signals that have been input in accordance with the result of determination input from the synchronizability determining section 5, and outputs the signal as display synchronization signal Vo. If a result of determination indicating the leading edge of synchronization signal Vx is present within the compensation period is input, synchronization signal Vx is output as display synchronization signal Vo. On the other hand, if a result of determination indicating the leading edge of synchronization signal Vx is not present within the compensation period is input, the signal input from the compensation mode selecting section 27 is output as display synchronization signal Vo.

The signal output from the compensation mode selecting section 27 to the display synchronization selecting section 6 is different between when display compensation is enabled and it is disabled. When display compensation is enabled, synchronization signal Vl input from the Vl synchronization signal generating section 25 is output. On the other hand, when display compensation is disabled, display reference synchronization signal Vb input from the compensation mode selecting section 21 is output.

Therefore, when the leading edge of synchronization signal Vx is not present within the compensation period and display compensation is enabled, synchronization signal Vl is output as display synchronization signal Vo. Also, when the leading edge of synchronization signal Vx is not within the compensation period and display compensation is disabled, display reference synchronization signal Vb is output as display synchronization signal Vo.

A method for synchronizing input synchronization signal Vi having a frequency of, for example, 24 Hz with display reference synchronization signal Vb having a frequency of, for example, 60 Hz using a video signal synchronization signal generating apparatus configured as shown above will be described.

First, the compensation mode selecting sections 21 and 27 are switched to disabled, and display reference synchronization signal Vb having a frequency of 60 Hz is output as display synchronization signal Vo. The display synchronization signal Vo is fed back to the frequency ratio detecting section 3, and the frequency ratio generating section 35 calculates the frequency ratio n (=5) between the input synchronization signal Vi and display synchronization signal Vo (i.e., display reference synchronization signal Vb).

The calculated frequency ratio n is input to the Vx generation comparator circuit section 42, in which a coincidence signal Vx' having a frequency of about 120 Hz is generated. The coincidence signal Vx' is input to the Vx generation circuit section 43, in which the alternate leading edges of the coincidence signal Vx' are removed to generate synchronization signal Vx having a frequency of about 60 Hz. Since coincidence signal Vx' is always reset according to input synchronization signal Vi, input synchronization signal Vi and synchronization signal Vx are always synchronized with each other.

Synchronization signal Vx is input to the synchronizability determining section 5, which determines whether the leading edge of signal Vx is present within the display compensation period or not. In a state immediately after start of synchronization where the input synchronization signal Vi is not synchronized with display reference synchronization signal Vb, synchronization signal Vx is not present within the display compensation period. Therefore, immediately after start of synchronization, a signal output from the compensation mode selecting section 27 is output from the display synchronization selecting section 6 as display synchronization signal Vo.

Here, as the compensation mode selecting sections 21 and 27 are immediately switched to enabled immediately after calculation of the frequency ratio n, synchronization signal Vl is output from the compensation mode selecting section 27. A characteristic of the period of synchronization signal Vl is the ability to make its phase close to the phase of the synchronization signal Vx faster than display reference synchronization signal Vb in spite of being a frequency that can be displayed on a video device.

When the leading edge of synchronization signal Vx has come within the display compensation period as the phase of synchronization signal Vx becomes close to the phase of synchronization signal Vl, synchronization signal Vx is output as display synchronization signal Vo in place of synchronization signal Vl. Because synchronization signal Vx is always synchronized with input synchronization signal Vi, display synchronization signal Vo and input synchronization signal Vi become synchronized with each other when display synchronization signal Vo has changed from synchronization signal Vl to synchronization signal Vx.

As described above, the embodiment of the present invention calculates the frequency ratio n between input synchronization signal Vi and display reference synchronization signal Vb, and in accordance with the frequency ratio n, generates synchronization signal Vx that can be synchronized to display reference synchronization signal Vb, has a frequency in proximity to the frequency of display reference synchronization signal Vb, and that is always in synchronization with input synchronization signal Vi, and uses the synchronization signal Vx as display synchronization signal Vo at a point in time when synchronization signal Vx has become synchronized to display reference synchronization signal Vb. This can increase the possibility of synchronization between input synchronization signal Vi and display synchronization signal Vo and prevent degradation of video quality even when the signals Vi and Vo have different frequencies.

According to the above-described embodiment, it is possible to increase the possibility that the input vertical synchronization frequency of a video signal and the display vertical synchronization frequency of a video device are synchronized with each other and prevent degradation of video quality even when they are different frequencies.

Having described the embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. A video signal synchronization signal generating apparatus for making a display reference synchronization signal that serves as a reference of video display and has a first frequency and an input synchronization signal that constitutes images and has a second frequency synchronized with each other and outputting a resulting signal as a display synchronization signal, the apparatus comprising:
    a frequency ratio generating section configured to divide a frequency that is double the first frequency by the second frequency to calculate a frequency ratio; and
    a synchronization signal generating section configured to generate a signal having pulses that are inserted by equally dividing one period of the input synchronization signal by the frequency ratio and remove the alternate pulses of the signal to generate a synchronization signal of a same phase as the phase of the input synchronization signal;
    wherein the frequency ratio generating section calculates the frequency ratio using a counter value of a first counter which is reset according to the display synchronization signal and a counter value of a second counter which is reset according to the input synchronization signal;
    a display synchronization selecting section configured to output the synchronization signal as the display synchronization signal if the synchronizability determining section determines that the synchronization signal is within the frequency limit range, and output a synchronization signal having the displayable lowest frequency as the display synchronization signal if the synchronizability determining section determines that the synchronization signal is not within the frequency limit range.

2. The video signal synchronization signal generating apparatus according to claim 1, further comprising a display compensation section configured to generate the display synchronization signal which is to be synchronized to the input synchronization signal based on the synchronization signal and perform display compensation such that the frequency of the display synchronization signal falls within a frequency limit range from a displayable lowest frequency which is preset to a displayable highest frequency which is preset.

3. The video signal synchronization signal generating apparatus according to claim 2, further comprising a synchronizability determining section configured to determine whether the synchronization signal is within the frequency limit range or not.

4. The video signal synchronization signal generating apparatus according to claim 3, further comprising a display synchronization selecting section configured to output the synchronization signal as the display synchronization signal if the synchronizability determining section determines that the synchronization signal is within the frequency limit range, and output a synchronization signal having the displayable lowest frequency as the display synchronization signal if the synchronizability determining section determines that the synchronization signal is not within the frequency limit range.

5. The video signal synchronization signal generating apparatus according to claim 1, further comprising a synchronizability determining section configured to determine whether the synchronization signal is within the frequency limit range or not.

6. The video signal synchronization signal generating apparatus according to claim 5, further comprising a display synchronization selecting section configured to output the synchronization signal as the display synchronization signal if the synchronizability determining section determines that the synchronization signal is within the frequency limit range, and output a synchronization signal having the displayable lowest frequency as the display synchronization signal if the synchronizability determining section determines that the synchronization signal is not within the frequency limit range.

7. A video signal synchronization signal generating apparatus for synchronizing an input synchronization signal having an externally input second frequency to a display reference synchronization signal that has a first frequency and serves as a reference of video display, and outputting a resulting signal as a display synchronization signal, the apparatus comprising:
 a frequency ratio generating section configured to divide a frequency that is double the first frequency by the second frequency to calculate a frequency ratio; and
 a synchronization signal generating section configured to generate a signal that rises at points of equal division of one period of the input synchronization signal by the frequency ratio, and remove the alternate leading edges of the signal to generate a synchronization signal of a same phase as the phase of the input synchronization signal;
 wherein the frequency ratio generating section calculates the frequency ratio using a counter value of a first counter which is reset according to the display synchronization signal and a counter value of a second counter which is reset according to the input synchronization signal;
 a display compensation section configured to generate the display synchronization signal which is to be synchronized to the input synchronization signal based on the synchronization signal and perform display compensation such that the frequency of the display synchronization signal falls within a frequency limit range from a displayable lowest frequency which is preset to a displayable highest frequency which is preset.

8. The video signal synchronization signal generating apparatus according to claim 7, further comprising a display compensation section configured to generate the display synchronization signal which is to be synchronized to the input synchronization signal based on the synchronization signal and perform display compensation such that the frequency of the display synchronization signal falls within a frequency limit range from a displayable lowest frequency which is preset to a displayable highest frequency which is preset.

9. The video signal synchronization signal generating apparatus according to claim 8, further comprising a synchronizability determining section configured to determine whether the synchronization signal is within the frequency limit range or not.

10. The video signal synchronization signal generating apparatus according to claim 9, further comprising a display synchronization selecting section configured to output the synchronization signal as the display synchronization signal if the synchronizability determining section determines that the synchronization signals is within the frequency limit range, and output a synchronization signal having the displayable lowest frequency as the display synchronization signal if the synchronizability determining section determines that the synchronization signal is not within the frequency limit range.

11. The video signal synchronization signal generating apparatus according to claim 7, further comprising:
 a synchronizability determining section configured to determine whether the synchronization signal is within the frequency limit range or not; and
 a display synchronization selecting section configured to output the synchronization signal as the display synchronization signal if the synchronizability determining section determines that the synchronization signals is within the frequency limit range and output a synchronization signal having the displayable lowest frequency as the display synchronization signal if the synchronizability determining section determines that the synchronization signal is not within the frequency limit range.

12. A video signal synchronization signal generation method for making a display reference synchronization signal that serves as a reference of video display and has a first frequency and an input synchronization signal that constitutes images and has a second frequency synchronized with each other and outputting a resulting signal as a display synchronization signal, the method comprising:
 dividing a frequency that is double the first frequency by the second frequency to calculate a frequency ratio;
 generating a signal having pulses that are inserted by equally dividing one period of the input synchronization signal by the frequency ratio; and
 removing the alternate pulses of the signal to generate a synchronization signal of a same phase as the phase of the input synchronization signal;
 wherein the frequency ratio is calculated using a counter value of a first counter which is reset according to the display synchronization signal and a counter value of a second counter which is reset according to the input synchronization signal;

the display synchronization signal which is to be synchronized to the input synchronization signal is generated based on the synchronization signal, and display compensation is performed such that the frequency of the display synchronization signal falls within a frequency limit range from a displayable lowest frequency which is preset to a displayable highest frequency which is preset.

13. The video signal synchronization signal generation method according to claim 12, further comprising determining whether the synchronization signal is within the frequency limit range or not.

14. The video signal synchronization signal generation method according to claim 13, wherein the synchronization signal is output as the display synchronization signal if it is determined that the synchronization signal is within the frequency limit range, and a synchronization signal having the displayable lowest frequency is output as the display synchronization signal if it is determined that the synchronization signal is not within the frequency limit range.

* * * * *